(12) United States Patent
Pree

(10) Patent No.: US 10,787,294 B2
(45) Date of Patent: Sep. 29, 2020

(54) BUNG PLUG HAVING AN INTEGRATED PRESSURE COMPENSATION MEANS

(71) Applicant: PROTECHNA S.A., Fribourg (CH)

(72) Inventor: Karl-Heinz Pree, Etzbach (DE)

(73) Assignee: PROTECHNA S.A., Fribourg (CH)

(*) Notice: Subject to any disclaimer, the term of this patent is extended or adjusted under 35 U.S.C. 154(b) by 302 days.

(21) Appl. No.: 15/768,057

(22) PCT Filed: Oct. 25, 2016

(86) PCT No.: PCT/EP2016/075603
§ 371 (c)(1),
(2) Date: Apr. 13, 2018

(87) PCT Pub. No.: WO2017/097485
PCT Pub. Date: Jun. 15, 2017

(65) Prior Publication Data
US 2018/0319548 A1    Nov. 8, 2018

(30) Foreign Application Priority Data

Dec. 8, 2015  (DE) .................. 20 2015 008 399 U

(51) Int. Cl.
*B65D 51/16*  (2006.01)
*B65D 39/08*  (2006.01)
(Continued)

(52) U.S. Cl.
CPC ........... *B65D 39/082* (2013.01); *B65D 39/08* (2013.01); *B65D 51/1644* (2013.01);
(Continued)

(58) Field of Classification Search
CPC ........... B60K 2015/03368; B60K 2015/03256; B65D 39/082; B65D 39/08;
(Continued)

(56) References Cited

U.S. PATENT DOCUMENTS 2,743,737 A * 5/1956 Textor .................. F16K 17/19
137/493
6,923,339 B2  8/2005 Lu
(Continued)

FOREIGN PATENT DOCUMENTS

CN    1177329 C    3/1998
CN    1221697 A    7/1999
(Continued)

OTHER PUBLICATIONS

English Machine Translation Abstract of JPH11342969A dated Dec. 14, 1999.
(Continued)

*Primary Examiner* — Gideon R Weinerth
(74) *Attorney, Agent, or Firm* — King & Schickli, PLLC

(57) ABSTRACT

The invention relates to bung plug (10) having an integrated pressure compensation means for arrangement in a container lid of a liquid container, the bung plug (10) having a valve housing (15) below a plug depression (12), the valve housing (15) being provided with air passage openings (39, 40) and having a receiving pin (16) arranged centrically in the valve housing (15) for arranging a valve diaphragm (17) whose diaphragm hub (18) is arranged on the receiving pin (16), a radially outward ring edge (19) of the valve diaphragm (17) being in contact with a ring shoulder (20) of the valve housing (15), the diaphragm hub (18) being arranged between a depression bottom (14) of the plug depression (12) and a lid hub (22) of a surge lid (21) arranged on the receiving pin (16) and provided with air passage openings (39, 40), a surge disk (32) being provided between the surge lid (21) and the valve diaphragm (17), wherein the surge disk (32) and the surge lid (21) are realized as a unit and the surge lid (21) has a mounting disk (26) arranged at an axial distance from the surge disk (32) for mounting in the valve housing (15), said mounting disk (26) having an outer
(Continued)

mounting edge for forming an engagement connection with a mounting seat arranged at an inner side (29) of a housing wall (30) of the valve housing (15).

6 Claims, 1 Drawing Sheet

(51) Int. Cl.
    *F16K 17/18* (2006.01)
    *F16K 17/19* (2006.01)
    *B65D 90/34* (2006.01)

(52) U.S. Cl.
    CPC .............. *F16K 17/18* (2013.01); *F16K 17/19* (2013.01); *B65D 90/34* (2013.01)

(58) Field of Classification Search
    CPC B65D 51/1644; B65D 51/1616; B65D 51/18; B65D 77/225; B65D 2205/00; B65D 88/16; B65D 90/26; B65D 90/34; B65D 90/28; B67D 7/362; F16K 17/18; F16K 17/19; F16K 17/196; F16K 21/18; F16K 24/06; Y10T 137/7287
    USPC ............ 137/493.9, 550, 403, 409, 426, 843; 251/127; 220/203.01, 203.29, 203.13, 220/203.12, 203.11, 203.18, 203.19, 220/203.24, 203.25, 203.28, 303, 374, 220/370, 745, 89.1, 281, 495.06, 1.6; 429/53, 54, 55, 56

See application file for complete search history.

(56) References Cited

U.S. PATENT DOCUMENTS

| | | | | |
|---|---|---|---|---|
| 2005/0284875 A1* | 12/2005 | Kito | ............. | F16K 24/042 220/745 |
| 2006/0096985 A1* | 5/2006 | Stolzman | ........... | B65D 51/1644 220/276 |
| 2007/0084510 A1* | 4/2007 | Kaneko | ................. | F16K 24/044 137/202 |
| 2010/0282751 A1 | 11/2010 | Quirijnen | | |
| 2011/0056938 A1* | 3/2011 | Petrarca | ................. | B65D 90/34 220/203.01 |
| 2011/0067392 A1* | 3/2011 | Cella | ....................... | B60T 17/06 60/453 |
| 2014/0141292 A1* | 5/2014 | Lee | ..................... | H01M 10/121 429/54 |
| 2018/0319548 A1* | 11/2018 | Pree | ........................ | F16K 17/19 |

FOREIGN PATENT DOCUMENTS

| | | |
|---|---|---|
| CN | 1572665 A | 2/2005 |
| CN | 101618776 A | 1/2010 |
| CN | 202927164 U | 5/2013 |
| DE | 29608342 U1 | 7/1996 |
| DE | 20011618 U1 | 10/2000 |
| EP | 0922649 A1 | 6/1999 |
| JP | S59112754 U | 7/1984 |
| JP | H11342969 A | 12/1999 |
| JP | 2002347454 A | 12/2002 |

OTHER PUBLICATIONS

English Machine Translation Abstract of JP2002347454A dated Dec. 4, 2002.

English Machine Translation Abstract of JPS59112754U dated Jul. 30, 1984.

\* cited by examiner

U.S. Patent Sep. 29, 2020 US 10,787,294 B2
Fig. 1
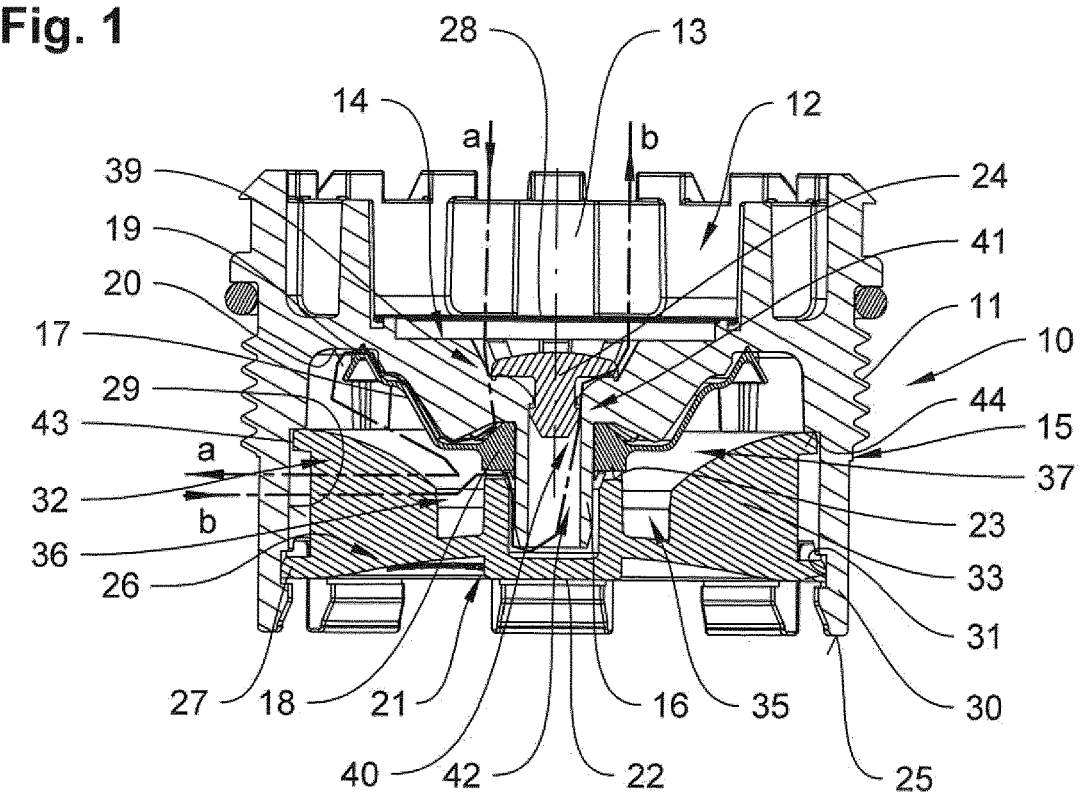
Fig. 2
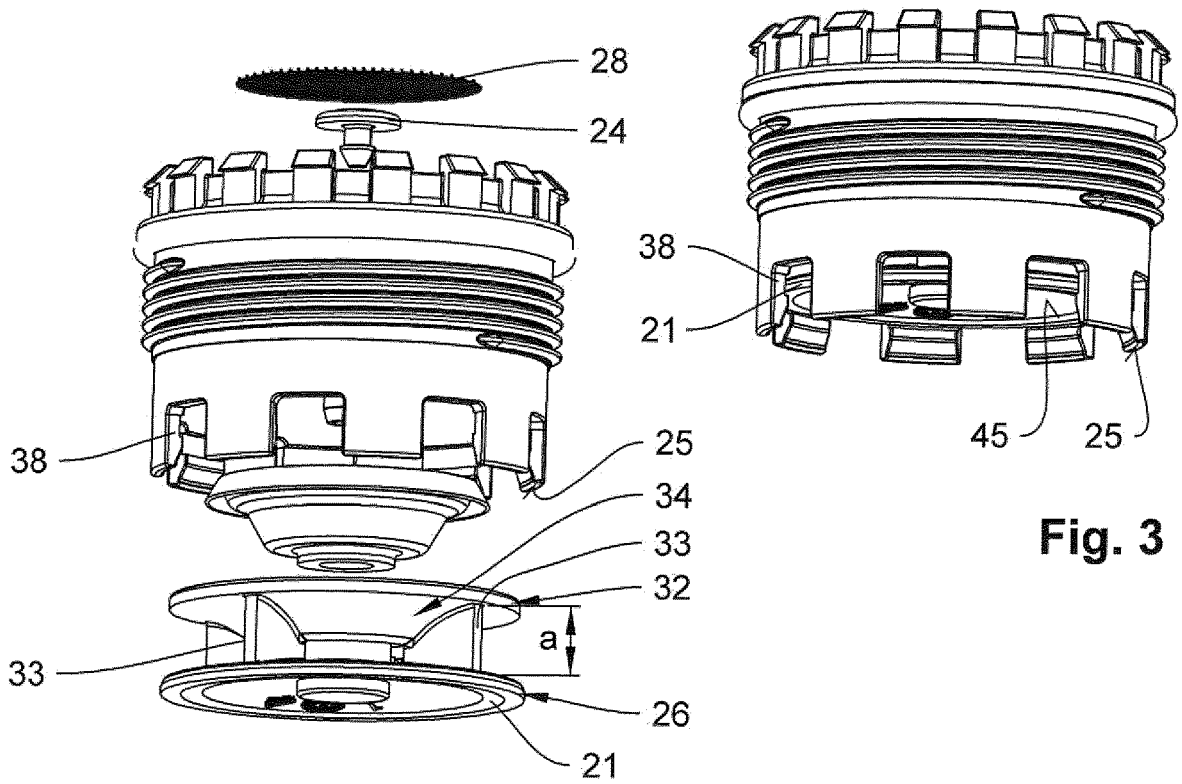
Fig. 3

BUNG PLUG HAVING AN INTEGRATED PRESSURE COMPENSATION MEANS

FIELD OF THE INVENTION

The present invention relates to a bung plug having an integrated pressure compensation means for arrangement in a container lid of a liquid container, the bung plug having a valve housing below a plug depression, the valve housing being provided with air passage openings and having a receiving pin arranged centrically in the valve housing for arranging a valve diaphragm whose diaphragm hub is arranged on the receiving pin, a radially outward ring edge of the valve diaphragm being in contact with a ring shoulder of the valve housing, the diaphragm hub being arranged between a bottom of the plug depression and a lid hub of a surge lid arranged on the receiving pin and provided with air passage openings, a surge disk being provided between the surge lid and the valve diaphragm.

BACKGROUND OF THE INVENTION

A bung plug of the kind mentioned above is known from EP 0 922 649 A1, wherein the surge disk and the surge lid are realized as independent elements, which have to be inserted into the valve housing in a defined installation order when being installed in the valve housing. Installation of the surge lid in the valve housing is also possible independently from a previous arrangement of the surge disk in the valve housing because the surge lid is attached in the valve housing independently from the surge disk via a clamping connection between the surge lid and the receiving pin of the valve housing.

It follows from the above that, on the one hand, it is easily possible for the preceding arrangement of the surge disk in the valve housing to be forgotten or omitted when the surge lid is installed, the desired function of the pressure compensation means thus not being available.

Moreover, the exclusively central attachment of the surge lid at the receiving pin of the valve housing leads to the possibility that the surge lid may fall into the container interior if the clamping connection fails.

SUMMARY OF THE INVENTION

Based on the present state of the art, the object of the invention is to provide a bung plug having an integrated pressure compensation means that allows fail-safe installation of the bung plug owing to its design and that exhibits increased operational safety.

To attain this object, the bung plug according to the invention has the features of claim 1.

According to the invention, the surge disk and the surge lid are realized as a unit, and the surge lid has a mounting disk arranged at an axial distance from the surge disk for mounting in the valve housing, said mounting disk having an outer mounting edge for forming an engagement connection with a mounting seat arranged at an inner side of a housing wall of the valve housing.

Because of the design of the surge disk and the surge lid as a unit according to the invention, installation of the surge lid is possible only together with the surge disk, omission of the surge disk when installing the surge lid thus being preluded.

Owing to the engagement connection with the housing wall, a secure fixation of the surge lid to the valve housing is provided, the danger of the surge lid becoming detached from the valve housing or from the bung plug and potentially falling into the container interior thus being eliminated. Moreover, the engagement connection allows defined positioning of the surge lid on the valve housing.

Preferably, the mounting disk and the surge disk of the surge lid are formed contiguously in one piece, which not only means that they form a unit—which in particular also includes the formation of a fitted connection between the mounting disk and the surge disk—during installation, but also that the mounting disk and the surge disk can be produced in a single production process.

For realizing the engagement connection, it is advantageous if the mounting edge is realized as a locking ring and the mounting seat is realized as a locking groove.

In a preferred embodiment of the bung plug, the surge lid has spacer ribs for realizing the axial distance between the mounting disk and the surge disk, and the housing wall has air passage openings radially adjacent to the spacer ribs.

If the surge disk has an outer support edge for supporting the surge disk against a support shoulder formed in the valve housing, the support shoulder provides an installation aid in such a manner that the lid disk merely needs to be positioned against the support shoulder with the support edge of the surge disk so as to produce a relative positioning between the surge lid and the housing wall that is suitable for a secure engagement of the mounting edge of the mounting disk into the mounting seat of the housing wall of the valve housing.

It is particularly advantageous if an underside of the mounting disk of the surge lid adjacent to the lower edge of the bung plug is recessed from the lower edge of the bung plug or is arranged in the same horizontal plane as the lower edge of the bung plug, thus preventing the surge lid from protruding beyond the lower edge of the bung plug and consequently allowing a particularly protected arrangement of the surge lid in the bung plug.

DESCRIPTION OF THE DRAWING FIGURES

Hereafter, a preferred embodiment of the bung plug will be explained in more detail with the aid of the drawing.

In the drawing:

FIG. 1 shows a sectional illustration of a bung plug;

FIG. 2 shows an isometric illustration of the bung plug illustrated in FIG. 1 immediately prior to installation of a surge lid in the valve housing of the bung plug; and FIG. 3 shows a view of the bung plug corresponding to the illustration in FIG. 2 after completed installation of the surge lid in the valve housing.

DETAILED DESCRIPTION OF THE INVENTION

FIG. 1 shows a bung plug 10 provided with an outer thread 11 for arrangement in a container lid (not illustrated) of a liquid container. In its upper portion, the bung plug 10 has a plug depression 12 having tool access portions 13 distributed across the circumference of an inner wall of the plug depression 12 and protruding radially into the plug depression 12, said tool access portions 13 allowing a screwing torque to be transmitted to the bung plug 10 by means of a suitably designed tool engaging the plug depression 12 so as to screw the bung plug 10 into the container lid (not illustrated) or to remove it therefrom.

The plug depression 12 has a depression bottom 14 that separates a valve housing 15 formed in the lower portion of the bung plug 10 from the plug depression 12.

The valve housing 15 has a receiving pin 16 arranged centrically on the depression bottom 14 and used to arrange a valve diaphragm 17 in the valve housing 15, said valve diaphragm 17 preferably being realized as a rubber diaphragm. In its cross-section, the valve diaphragm 17 forms a hat-shaped profile, which is illustrated in FIG. 1, and has a diaphragm hub 18 for arranging the valve diaphragm 17 on the receiving pin 16 and a radially outward ring edge 19 that is configured to come into sealing contact with a ring shoulder 20 formed at the underside of the depression bottom 14 and forming a valve seat.

The lower end of the valve housing 15 is formed by a surge lid 21 that is inserted into the valve housing 15 and whose lid hub 22 is arranged on the receiving pin 16 in such a manner that the diaphragm hub 18 of the valve diaphragm 17 is received between an underside of the depression bottom 14 and a ring edge 23 of the lid hub 22.

As becomes apparent in particular from a combined view of FIGS. 1 and 2, the surge lid 21 has a mounting disk 26 arranged adjacent to a lower edge 25 of the bung plug for attaching the surge lid 21 to a housing wall 30 of the valve housing 15 by means of an outer mounting edge realized as a locking ring 27 and engaging into a mounting seat realized as a locking groove 31 above the lower edge 25 of the bung plug on an inner side 29 of the housing wall 30.

Forming a unit with the mounting disk 26, the surge lid 21 has a surge disk 32, the unit formed between the mounting disk 26 and the surge disk 32 being realized by way of a one-piece contiguous design of the mounting disk 26 and the surge disk 32 in the case of the exemplary embodiment illustrated at hand. As shown in particular in FIG. 2, the one-piece connection between the mounting disk 26 and the surge disk 32 is made possible by spacer ribs 33 formed between the mounting disk 26 and the surge disk 32, said spacer ribs 33 defining an axial distance a between the mounting disk 26 and the surge disk 32.

Between the spacer ribs 33, rib spaces 34 are formed that extend radially inward and into a ring gap 35 formed in the surge lid 21 and concentrically surrounding the lid hub 22, the rib spaces 34 together with the ring gap 35 thus forming air passage openings 36 that allow a radial air flow a, b directed both outward and inward through the surge lid 21 and thus allowing, together with air passage openings 38 formed in the housing wall 30 on the lower edge 25 of the bung plug adjacent to the rib spaces 34, an air exchange between a container interior and a valve chamber 37 formed in the valve housing 15.

In cooperation with the air passage openings 38 formed in the housing wall 30, the air passage openings 36 formed in the surge lid 21, air passage openings 39 formed in the depression bottom 14 and a central air passage opening 40, the valve diaphragm 17 allows both aerating a container interior and deaerating a container interior through a pin bottom 41 formed in the depression bottom 14. In the case of the illustrated exemplary embodiment, a mushroom valve 24 is arranged in the air passage opening 40.

The container interior is aerated under negative pressure formed in the container interior, the ring edge 19 of the valve diaphragm 17 being lifted from the ring shoulder 20 as a result of the negative pressure and an air flow a flowing through the air passage opening 39 in the depression bottom 14, the valve chamber 37 and the air passage openings 36 in the surge lid 21 and the air passage openings 38 in the housing wall 30 and into the container interior via the aeration path indicated in FIG. 1. The container is deaerated under positive pressure formed in the container interior in relation to the environment, as a result of which the diaphragm hub 18 shifts on the receiving pin 16 against the depression bottom 14 and opens a ring gap between a ring edge 23 of the lid hub 22 and the diaphragm hub 18, through which a deaerating flow b can flow around the receiving pin 16, into a pin interior 42 and through the passage opening 40 formed in the pin bottom 41 and a protection grid 28 arranged above the depression bottom 14 and finally to the outside, as illustrated in FIG. 1. As a result, the valve diaphragm 17 arranged in the valve housing 15, in cooperation with the air passage openings 36, 38, 39, 40, thus forms a pressure compensation means integrated in the bung plug 10 for aerating and deaerating the container interior.

In the case in which, contrary to the illustrated embodiment, no air passage opening 40 provided with a mushroom valve 24 is formed in the depression bottom 14, gas exchange for pressure compensation is possible in one direction only.

As shown in particular in FIGS. 1 and 2, the surge disk 32, which is formed monolithically with the mounting disk 26 in the case at hand so as to form the surge lid 21, is provided with an outer support edge 43 for supporting the surge disk 32 against a support shoulder 44 formed in the valve housing 15 of the bung plug 10. The fact that the surge disk 32 is supported against the support shoulder 44 allows a dimensionally elastic pre-tensioned installation of the surge lid 21 in the valve housing 15 when the locking ring 27 of the mounting disk 26 is fitted into the locking groove 31.

As illustrated by FIGS. 1 and 3, the surge lid 21 is inserted into the valve housing 15 of the bung plug 10 in such a manner that an underside 45 of the mounting disk 26 is arranged in a recessed manner in relation to the lower edge 25 of the bung plug.

The invention claimed is:

1. A bung plug (10) having an integrated pressure compensation means for arrangement in a container lid of a liquid container, the bung plug comprising a valve housing (15) below a plug depression (12), the valve housing being provided with air passage openings (38, 39, 40) and having a receiving pin (16) arranged centrically in the valve housing for arranging a valve diaphragm (17) with a diaphragm hub (18) arranged on the receiving pin, a radially outward ring edge (19) of the valve diaphragm being in contact with a ring shoulder (20) of the valve housing, the diaphragm hub being arranged between a depression bottom (14) of the plug depression and a lid hub (22) of a surge lid (21) arranged on the receiving pin and provided with air passage openings (36), a surge disk (32) being provided between the surge lid and the valve diaphragm, characterized in that the surge disk and the surge lid are realized as a unit and the surge lid has a mounting disk (26) arranged at an axial distance (a) from the surge disk for mounting in the valve housing, said mounting disk having an outer mounting edge for forming an engagement connection with a mounting seat arranged at an inner side (29) of a housing wall (30) of the valve housing.

2. The bung plug according to claim 1, characterized in that the mounting disk (26) and the surge disk (32) of the surge lid (21) are formed contiguously in one piece.

3. The bung plug according to claim 1, characterized in that the mounting edge is realized as a locking ring (27) and the mounting seat is realized as a locking groove (31).

4. The bung plug according to claim 1, characterized in that the surge lid (21) has spacer ribs (33) for realizing the axial distance a between the mounting disk (26) and the surge disk (32), and the housing wall (30) of the valve housing (15) has air passage openings (38) radially adjacent to rib spaces (34).

5. The bung plug according to claim 1, characterized in that the surge disk (32) has an outer support edge (43) for supporting the surge disk against a support shoulder (44) formed in the valve housing (15).

6. The bung plug according to claim 1, characterized in that an underside (45) of the mounting disk (26) adjacent to the lower edge (25) of the bung plug is recessed from the lower edge of the bung plug or is arranged in the same horizontal plane as the lower edge of the bung plug.

\* \* \* \* \*